US009368116B2

(12) United States Patent
Ziv et al.

(10) Patent No.: US 9,368,116 B2
(45) Date of Patent: Jun. 14, 2016

(54) SPEAKER SEPARATION IN DIARIZATION

(71) Applicant: Verint Systems Ltd., Herzilya Pituach (IL)

(72) Inventors: Omer Ziv, Ramat Gan (IL); Ron Wein, Ramat Hasharon (IL); Ido Shapira, Tel Aviv (IL); Ran Achituv, Hod Hasharon (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 273 days.

(21) Appl. No.: 14/016,783

(22) Filed: Sep. 3, 2013

(65) Prior Publication Data

US 2014/0074467 A1 Mar. 13, 2014

Related U.S. Application Data

(60) Provisional application No. 61/698,310, filed on Sep. 7, 2012, provisional application No. 61/861,178, filed on Aug. 1, 2013.

(51) Int. Cl.
| | |
|---|---|
| *G10L 17/00* | (2013.01) |
| *G10L 15/26* | (2006.01) |
| *G10L 25/78* | (2013.01) |
| *G10L 25/51* | (2013.01) |
| *G10L 17/06* | (2013.01) |

(52) U.S. Cl.
CPC .................. *G10L 15/26* (2013.01); *G10L 17/06* (2013.01); *G10L 25/51* (2013.01); *G10L 25/78* (2013.01); *G10L 2025/783* (2013.01)

(58) Field of Classification Search
CPC ......... G10L 17/02; G10L 17/00; G10L 17/04; G10L 17/12; G10L 17/14
USPC .......... 704/246, 250, 209, 231, 243, 249, 235
See application file for complete search history.

(56) References Cited

U.S. PATENT DOCUMENTS

| | | | | |
|---|---|---|---|---|
| 5,946,654 | A | * 8/1999 | Newman et al. | 704/246 |
| 2007/0071206 | A1 | * 3/2007 | Gainsboro et al. | 379/168 |
| 2007/0100608 | A1 | * 5/2007 | Gable et al. | 704/209 |
| 2009/0319269 | A1 | * 12/2009 | Aronowitz | 704/243 |
| 2011/0119060 | A1 | * 5/2011 | Aronowitz | 704/250 |

(Continued)

OTHER PUBLICATIONS

Lailler et al., ("Semi-Supervised and Unsupervised Data Extraction Targeting Speakers: From Speaker Roles to Fame", Proceedings of First Workshop on Speech, language and Audio in Multimedia (SLAM 2013), Marseille, France, Aug. 22-23, pp. 78-83).*

(Continued)

*Primary Examiner* — Vijay B Chawan
(74) *Attorney, Agent, or Firm* — Meunier Carlin & Curfman

(57) ABSTRACT

The system and method of separating speakers in an audio file including obtaining an audio file. The audio file is transcribed into at least one text file by a transcription server. Homogenous speech segments are identified within the at least one text file. The audio file is segmented into homogenous audio segments that correspond to the identified homogenous speech segments. The homogenous audio segments of the audio file are separated into a first speaker audio file and second speaker audio file the first speaker audio file and the second speaker audio file are transcribed to produce a diarized transcript.

15 Claims, 6 Drawing Sheets

(56) References Cited

U.S. PATENT DOCUMENTS

2011/0282661 A1* 11/2011 Dobry et al. ................... 704/231
2013/0300939 A1* 11/2013 Chou et al. ..................... 348/700

OTHER PUBLICATIONS

Schmalenstroeer et al., ("Online Diarization of Streaming Audio-Visual Data for Smart Environments", IEEE Journal of Selected Topics in Signal processing, vol. 4, No. 5, Oct. 2010, pp. 845-856).*
Cohen, I., "Noise Spectrum Estimation in Adverse Environment: Improved Minima Controlled Recursive Averaging," IEEE Transactions on Speech and Audio Processing, vol. 11, No. 5, 2003, pp. 466-475.
Cohen, I., et al., "Spectral Enhancement by Tracking Speech Presence Probability in Subbands," Proc. International Workshop in Hand-Free Speech Communication (HSC'01), 2001, pp. 95-98.
Hayes, M.H., "Statistical Digital Signal Processing and Modeling," J. Wiley & Sons, Inc., New York, 1996, 200 pages.
Viterbi, A.J., "Error Bounds for Convolutional Codes and an Asymptotically Optimum Decoding Algorithm," IEEE Transactions on Information Theory, vol. 13, No. 2, 1967, pp. 260-269.

* cited by examiner

SPEAKER SEPARATION IN DIARIZATION

CROSS-REFERENCE TO RELATED APPLICATIONS

The present application claims priority of U.S. Provisional Patent Application No. 61/698,310, filed on Sep. 7, 2012 and U.S. Provisional Patent Application No. 61/861,178, filed on Aug. 1, 2013, the contents of which are incorporated herein by reference in their entireties.

BACKGROUND

The present disclosure is related to the field of the transcription of audio data. More specifically, the present disclosure is related to speaker separation in diarizing audio data for transcription.

Audio data is often received as a single mono audio file although there are multiple speakers within the audio file. If the audio file can be segmented into audio data attributed to separate speakers, then further analysis techniques can be employed that are specifically directed to transcribing the speech of one of the speakers. This more focused approach can result in more accurate transcription. Therefore, there is a need for improved speaker separation within audio data.

BRIEF DISCLOSURE

Figure 1:
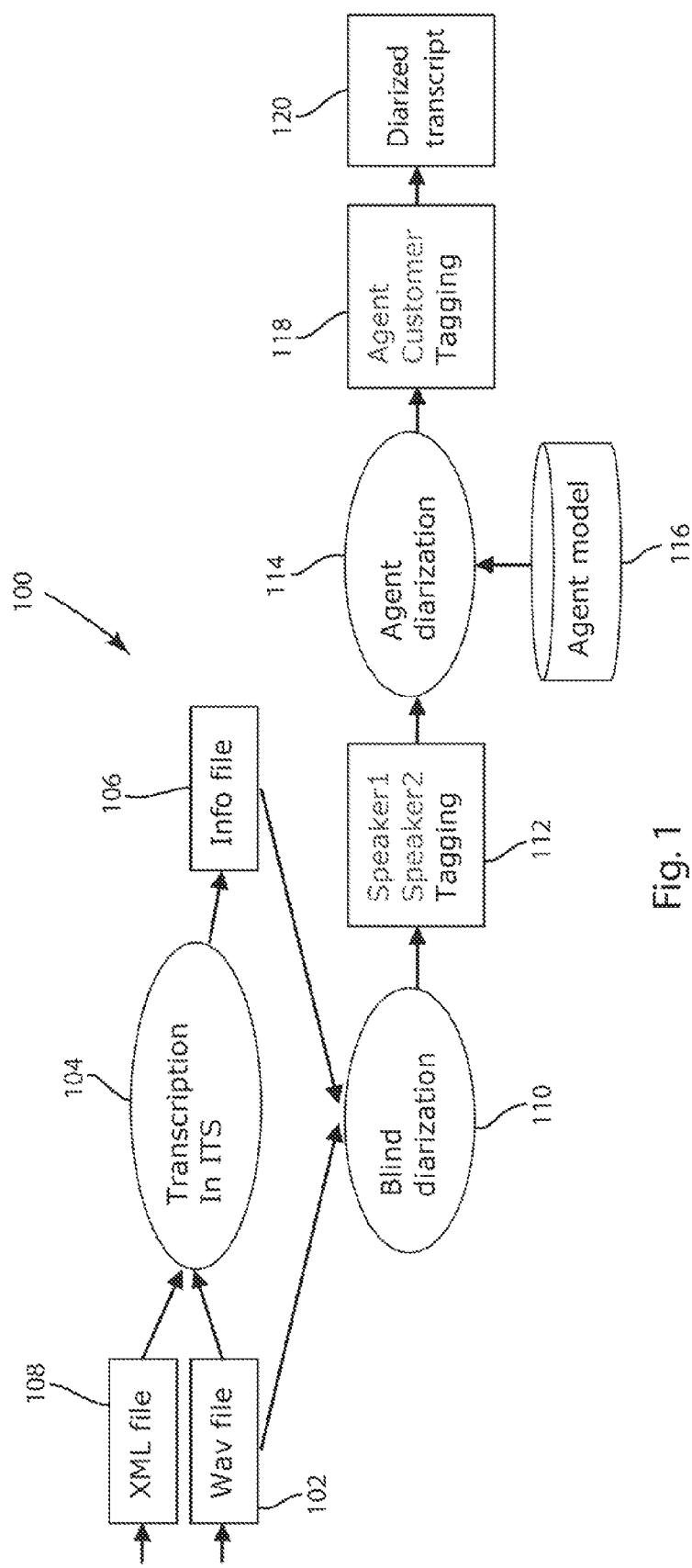
FIG. 1 is a flowchart that depicts an exemplary embodiment of a method of diarization.

A method of separating speakers in an audio file include obtaining an audio file. The audio file is transcribed into at least one text file. Homogeneous speech segments within the at least one text file are identified. The audio file is segmented into homogeneous audio segments that correspond to the identified homogeneous speech segments. The homogenous audio segments of the audio file are separated into a first speaker audio file and a second speaker audio file.

A method of audio diarization includes obtaining a digital audio file. The digital audio file is transcribed with an automated transcription to produce a text file. Homogenous speech segments in the text file are identified. The digital audio file is segmented into digital audio files segments based upon the identified homogenous speech segments in the text file. A blind diarization is performed to identify a first speaker audio file and a second speaker audio file by clustering the digital audio file segments into the first speaker audio file and the second speaker audio file. One of the first speaker audio file and the second speaker audio file is identified as an agent audio file. Another of the first speaker audio file and a second speaker audio file is identified as a customer audio file.

An exemplary embodiment of a system for audio diarization includes a transcription server that receives audio data, transcribes the audio data, and creates an information file that identifies at least one homogenous speech segment from the transcribed audio data. A blind diarization module operates on a computer processor. The blind diarization module receives the audio data and the information file. The blind diarization module identifies a first plurality of segments of the audio data as a first speaker audio file and a second plurality of segments of the audio data as a second speaker audio file. An agent diarization module operates on the computer processor. Agent diarization module receives an agent model. The agent diarization module compares the agent model to the first speaker audio file and the second speaker audio file. The agent diarization module identifies one of the first and second speaker audio files as an agent audio file and an other of the first and second speaker audio files as a customer audio file.

DETAILED DISCLOSURE

Speech transcription of an audio stream is enhanced by diarization wherein a speaker identity is identified and associated with transcribed speech. A speaker diarization system and method is aimed at identifying the speakers in a given call and associating each transcribed speech segment with an identified speaker. Speaker diarization thus enables the separation of speakers in transcription audio files.

Embodiments of a diarization process disclosed herein include a first step of a speech-to-text transcription of an audio file to be diarized. Next, a "blind" diarization of the audio file is performed. The audio file is exemplarily a .WAV file. The blind diarization receives the audio file and an information file from the speech-to-text transcription that includes at least a partial transcription of the audio file as inputs. Each term in the information file is associated between speakers based upon identified acoustic features. This diarization is characterized as "blind" as the diarization is performed prior to an identification of the speakers. In embodiment of a customer service call, it may be undetermined at the time of this diarization, which speaker is the agent and which speaker is the customer.

The blind diarization is followed by an agent diarization wherein an agent model that represents the speech and information content of the agent speaker is compared to the identified speech segments associated with the separate speakers. Through this comparison, one speaker can be identified as an agent, while the other speaker is thus identified as the customer.

The identification of segments in an audio file, such as an audio stream or recording (e.g. telephone call that contains speech) can facilitate increased accuracy in transcription, diarization, speaker adaption, and/or speech analytics of the audio file. An initial transcription, exemplarily from a fast speech-to-text engine, can be used to more accurately identify speech segments in an audio file, such as an audio stream or recording, resulting in more accurate diarization and/or speech adaptation.

A transcript resulting from automatic speech-to-text transcription provides information on speech segments such as phonemes, words, or sentences. These speech segments can then be clustered into groups of speech segments that have a high likelihood of emanating from the same speaker. These clustered segments can be used to discriminate between speakers in the diarization process. The identification and use of identifiable speech segments as the input for the diarization can further facilitate filtering out noise and other non-speech segments that can interfere with the diarization process.

FIG. 1 is a flow chart that depicts an exemplary embodiment of a method of diarization 100. It is to be understood that embodiments of the methods of diarization as disclosed herein may be performed by a computer processor executing computer readable code that causes the computer processor to carry out the functions and features as described herein. While reference is herein made to a processor, it is understood that embodiments may be carried out by the coordinated operation of two or more computer processors communicatively connected in a distributive processing system. Such implementations considered herein to be included in the use of the term "computer processor." In implementation each of the functions, steps or substeps as disclosed herein may be performed as one or more computer programs or computer program modules stored on one or more computer readable media and executed by the computer processor.

An audio file 102 is an audio recording of a conversation which may be between two speakers. The audio file may exemplarily be a .WAV file, but may also be other types of audio files in a pulse code modulation (PCM) format and examples may include linear pulse code modulated (LPCM) audio files. Furthermore, the audio file is exemplarily a mono audio file; however, it is recognized that embodiments of the method disclosed herein may also be used with stereo audio files. One feature of the method disclosed herein is that speaker separation in diarization can be achieved in mono audio files where stereo speaker separation techniques are not available. In still other embodiments, the audio file may be a streaming audio file.

The audio file 102 is provided to transcription server 104 that performs an automated speech-to-text transcription from the audio file. The transcription performed by the transcription server at 104 can exemplarily be a large-vocabulary continuous speech recognition (LVCSR). Alternatively, the transcription performed by the transcription server 104 can be automated speech recognition (ASR), speech-to-text (STT), or any other form of automated transcription. The audio file 102 provided to the transcription server 104 can exemplarily be a previously recorded audio file or can be a streaming audio file obtained from an ongoing communication between two speakers. The transcription from the transcription server 104 is used to create an information file 106. The information file 106 identifies homogeneous speaker speech segments from the transcription. Homogenous speech segments are those segments of the transcription that have a high likelihood of originating from a single speaker. The speech segments may exemplarily be phonemes, words, or sentences. Linguistic or speech pattern rules or models used to identify the homogeneous speech segments can be provided in a file 108 to the transcription server 104. The file 108 may exemplarily be an XML file.

After the information file 106 is created, both the audio file 102 and the information file 106 are used for a blind diarization at 110. The blind diarization is characterized as such as the identities of the speakers (e.g. agent, customer) are not known and therefore the diarization 110 discriminates between a first speaker (speaker 1) and a second speaker (speaker 2). Additionally, in some embodiments, those segments for which a speaker cannot be reliably determined, may be labeled as being of an unknown speaker.

Figure 5:
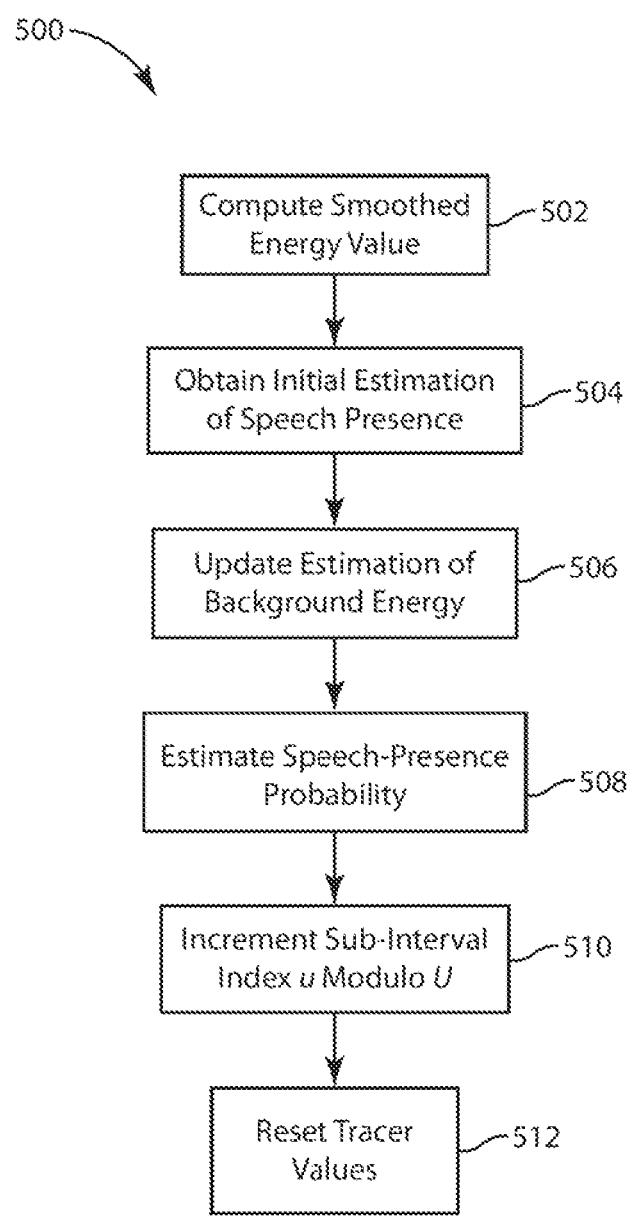
FIG. 5 is a flowchart that depicts an exemplary embodiment of a method of tracing energy values.

An embodiment of the blind diarization at 110 receives a mono audio file 102 and begins with the assumption that there are two main speakers in the audio file. The blind diarization separates the audio file into frames and analyzes those frames for diarization using two techniques. In a merely exemplary embodiment, a 20-25 millisecond frame of audio is processed every 10 milliseconds. Such speech frames are long enough to perform meaningful spectral analysis in relation to the temporal characteristics of the speech signal, yet they are short enough to give fine granularity to the output. The frames may then be grouped into utterances separated by non-speech segments in the audio file. Each utterance is a segment of speech likely attributed to a single speaker. Non-speech segments in the audio file can be identified by an evaluation of the energy envelope of each of the frames to segment the audio data into a plurality of utterances. In an embodiment, the utterances can be identified through Voice Activity Detection (VAD) as explained in further detail herein with respect to FIGS. 5 and 6.

A first technique uses energy envelopes in the audio file, or other audio analysis techniques to identify segments or utterances attributable to separate speakers. The blind diarization then filters out non-speech frames. In an exemplary embodiment, this filtering may be performed by removing a frame if the dynamic energy range in the frame is below a predetermined threshold. Alternatively, or in addition, frames may be removed if the high frequency energy in the frame falls outside of a predetermined pass band for high frequency energy in a frame.

In a second technique, the homogeneous speaker segments from the information file 106 are also used to segment the audio file. The homogeneous speaker segments from 106 are identified in the audio file. Then, long homogeneous speaker segments can be split into sub-segments if long silent intervals are found within a single segment. The sub-segments are selected to avoid splitting the long speaker segments within a word. The transcription information in the information file 106 can provide context to where individual words start and end. This speech segmentation can also be filtered to remove non-speech segments based upon a basic energy envelope analysis of the audio file, particularly those segments not identified as homogeneous speaker segments. In a non-limiting example, non-speech segments can be removed for which a particular energy percentile in a segment is below a minimum energy threshold or if a predetermined dynamic energy range percentile is below a minimum dynamic energy range threshold.

After the audio file has been segmented into a plurality of utterances based upon both the energy envelope analysis and the homogenous speaker segmentation described above, the identified segments are clustered into generalized speakers (speaker 1 and speaker 2 to which the segments are attributed). In a non-limiting example, the segments can be clustered in an iterative process using agglomerative hierarchical clustering (AHC). In an AHC, the merging order of the segments into clusters is based upon Bayesian information criteria (BIC) and given a BIC penalty. The iterative clustering process ends when no two clusters have a BIC criteria score greater than zero. This iterative clustering can result in any number of segment clusters.

The clusters are then evaluated against a minimum cluster size requirement. The minimum cluster size requirement may exemplarily be 10% of the total words in the audio file as identified by the transcription, or at least 15 words; however, these are merely exemplary and are not intending to the limiting on the cluster size criteria that may be used. All of the clusters meeting this minimum size requirement are then compared to select the two most distinct clusters in terms of BIC score. In an alternative embodiment, the two largest clusters may be selected.

These identified two most distinct clusters are then used to build speaker models from each of the two selected clusters. One speaker model is representative of speaker 1 and a second speaker model is representative of speaker 2. These new speaker 1 and speaker 2 models are then used to evaluate each of the previously identified homogeneous speaker segments in the audio file in order to calculate their likelihood that each segment originated from speaker 1 or speaker 2. This evaluation is used to tag at 112 the homogeneous speaker segments in the audio file as being associated with speaker 1 or speaker 2. If the likelihood determination meets a predetermined minimum likelihood threshold, then the homogeneous speaker segment is assigned to that particular speaker. If the minimum threshold is not achieved with respect to either of the speaker 1 model or the speaker 2 model, then the homogenous speaker segment is labeled as an unknown segment.

At 114 a second diarization, an "agent" diarization, is undertaken to identify which of speaker 1 and speaker 2 is the agent and which speaker is the customer. An agent model 116, which can be derived in a variety of manners or techniques to be representative of agent speech, is compared to the homogeneous speaker in the audio file segments assigned to speaker 1 and then compared to the homogeneous speaker segments in the audio file assigned to speaker 2 to determine which combination of homogenous speaker segments has a greater likelihood of matching the agent model 116. The homogeneous speaker segments tagged in the audio file as being the speaker that is most likely the agent based upon the comparison of the agent model 116 are tagged as the agent and the homogeneous speaker segments tagged in the audio file as being the other speaker are tagged at 118 as the customer. This produces an agent audio file and a customer audio file that only contains the audio data attributed to that speaker.

At 120 a final transcription is performed on the tagged diarized audio files. The transcription may be performed using an LVCSR transcription to apply one or more models adapted to transcribing a customer service agent speech or a customer speech to the corresponding agent or customer audio file. Given an input that represents a spoken utterance, the simplest output format from an LVCSR decoder at 108 is a sequence of recognized words, along with word boundaries. For example, the start and end time-stamp of each output word can be determined. In a non-limiting embodiment, this may be performed using the Viterbi algorithm as described in Viterbi A. J., "Error bounds for convolutional codes and an asymptotically optimum decoding algorithm". *IEEE Transactions on Information Theory* 13(2): 260-269 (1967), which is hereby incorporated by reference in its entirety.

Embodiments of the method described above can be performed or implemented in a variety of ways. In an embodiment, the transcription server, in addition to performing the LVCSR, can also perform the diarization process. Another alternative is to use a centralized server to perform the diarization process. In one embodiment, a stand-alone transcription server performs the diarization process locally without any connection to another server for central storage or processing. In an alternative embodiment, the transcription server performs the diarization, but relies upon centrally stored or processed models, such as the files 108 used to perform the initial transcription, or the agent models 116 used in the agent diarization 114. In a still further embodiment, a central dedicated diarization server may be used where the output of many transcription servers are sent to the centralized diarization server for processing. The centralized diarization server may have locally stored models that build from processing of all of the diarization at a single server.

Figure 2:
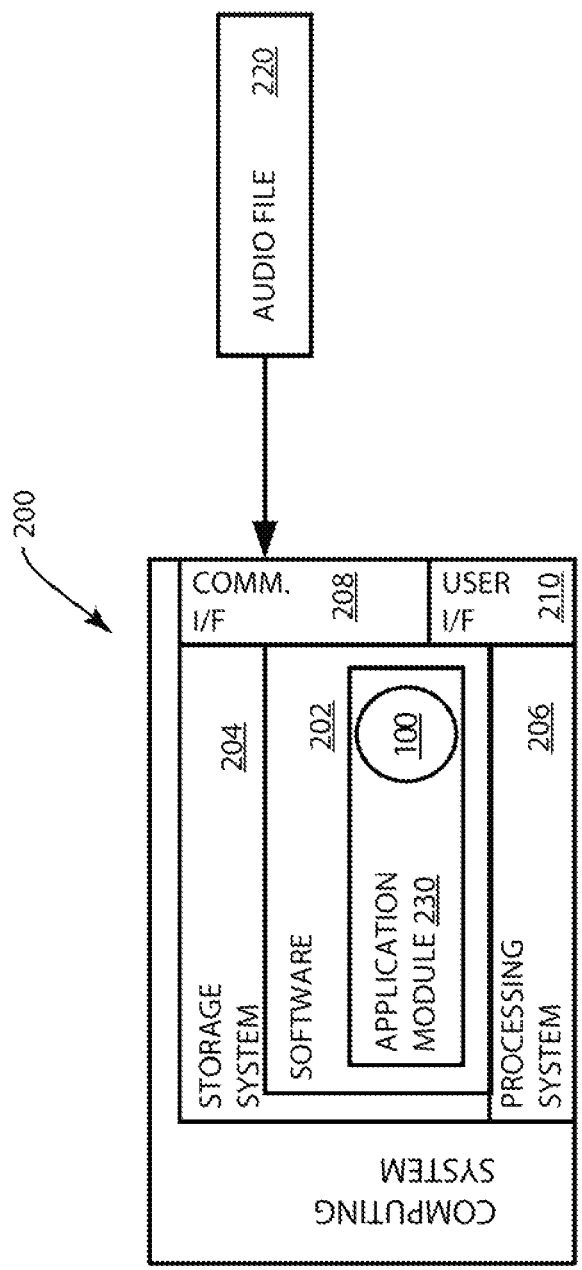
FIG. 2 is a system diagram that depicts an exemplary embodiment of a system for diarization.

FIG. 2 is a system diagram of an exemplary embodiment of a system 200 for diarization. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 100.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can comprise a microprocessor and other circuitry that retrieves and executes software 202 from storage system 204. Processing system 206 can be implemented within a single processing device but can also be distributed across multiple processing devices or sub-systems that cooperate in existing program instructions. Examples of processing system 206 include general purpose central processing units, applications specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propogated signal.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 210.

As described in further detail herein, the computing system 200 receives an audio file 220. The audio file 220 may be an audio recording or a conversation, which may exemplarily be between two speakers, although the audio recording may be any of a variety of other audio records, including multiples speakers, a single speaker, or an automated or recorded auditory message. The audio file may exemplarily be a .WAV file, but may also be other types of audio files, exemplarily in a pulse code modulation (PCM) format and an example may include linear pulse code modulated (LPCM) audio filed. Furthermore, the audio file is exemplary a mono audio file; however, it is recognized that embodiments of the method as disclosed herein may also be used with stereo audio files. In still further embodiments, the audio file may be streaming audio data received in real time or near-real time by the computing system 200.

Figure 3:
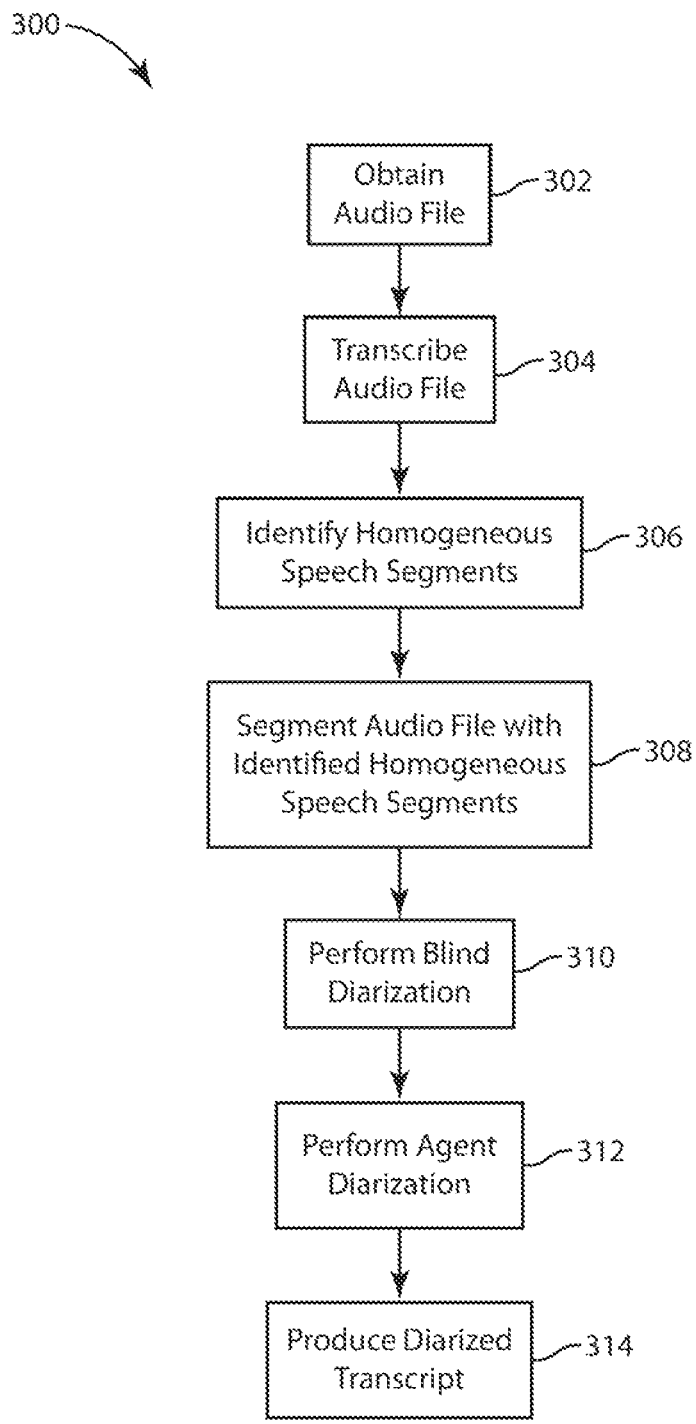
FIG. 3 is a flowchart that depicts an additional exemplary embodiment of a method of diarization.

FIG. 3 is a flowchart that depicts an exemplary additional embodiment of a method of producing a diarized transcript. The method 300 begins with obtaining an audio file at 302, exemplarily as described above. This audio file is transcribed at 304 to produce an initial transcription. The initial transcription from 304 is used at 306 in order to identify homogenous speech segments or speech segments that are likely to emanate from a single speaker in the transcription. At 308 the audio file is segmented into the identified homogenous speech segments identified from the transcription.

At 310 the blind diarization is performed to group the segments of the audio file together into groups of audio files that are likely to be from the same speaker. This blind diarization exemplarily groups the audio file segments into a first speaker audio file and a second speaker audio file.

At 312 an agent diarization is performed by comparing one or more agent linguistic, acoustic, or other models to the first audio file and the second audio file in order to make a determination of which of the audio files is attributed to the agent and the other of the audio files can be attributed to the customer. Once the audio files have been identified as an agent audio file and a customer audio file, a diarized transcript can be produced at 314, exemplarily with an LVCSR transcription decoder that applies a model adapted or tailored to the agent to the agent audio file and one or more models adapted or tailored to a customer to the customer audio file in order to produce a more accurate diarized transcript.

Figure 4:
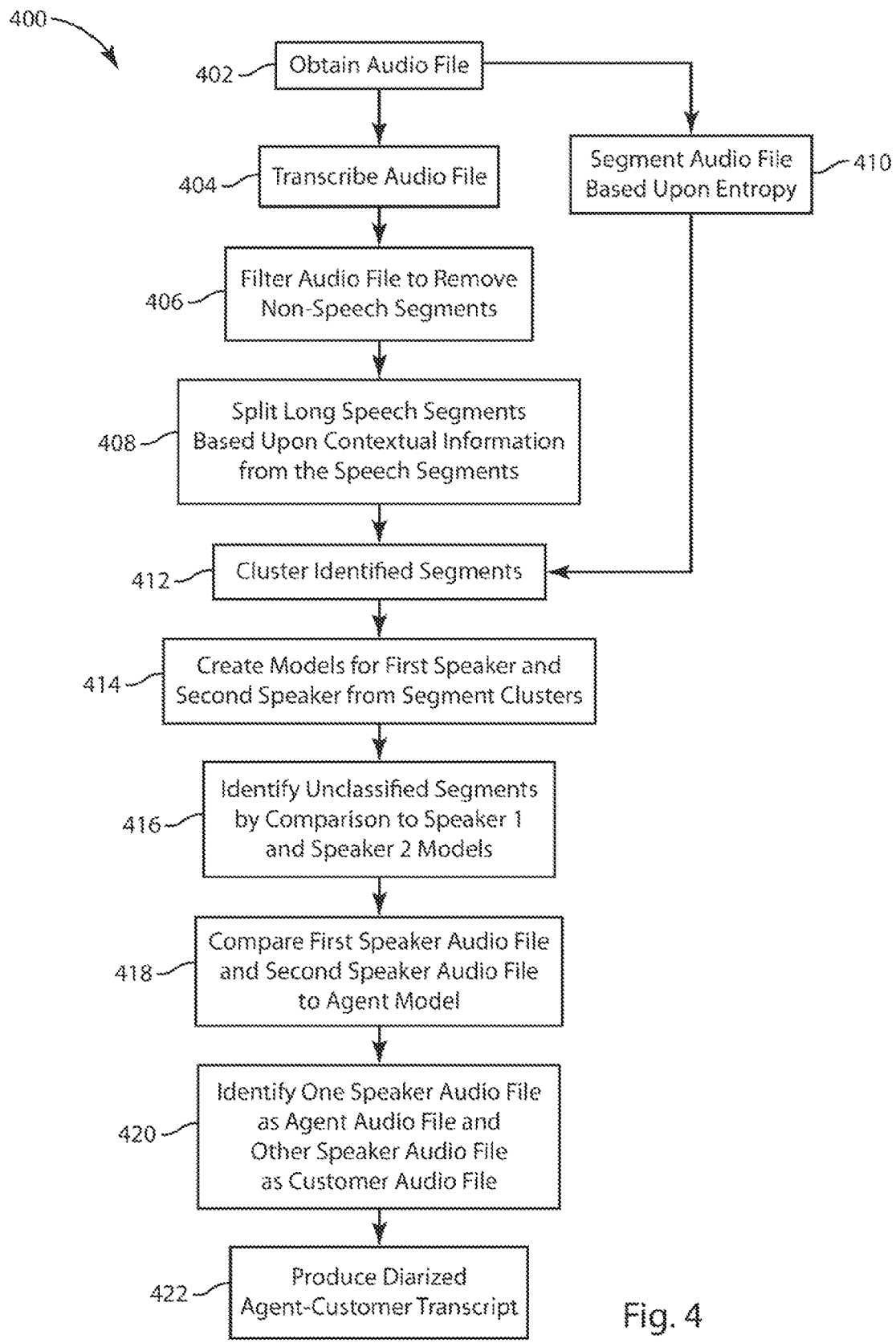
FIG. 4 is a flowchart that depicts a more detailed exemplary embodiment of the method of diarization as presented in FIG. 3.

FIG. 4 is a flowchart that depicts a more detailed exemplary embodiment of the method 300 described above. Particularly, the method 400 depicts a more detailed embodiment of performing a blind diarization, as explained above with respect to FIGS. 1 and 3.

In an embodiment, the audio file is split into a plurality of short overlapping frames. The over lapping frames are segmented into a plurality of homogenous speech segments by first filtering the audio file to remove non-speech segments at 406. This can be identified by long silence intervals in the transcription. Next, long speech segments are split at 408 based upon contextual information from the speech segments themselves. In an exemplary embodiment, the long speech segments are split in a manner such that words in the transcription remain whole. In alternative embodiments contextual analysis as may exemplarily be provided as speech analytics or word identification may identify words such as transitions that may indicate an appropriate place to divide long segments.

In an embodiment, the audio file may also be processed independent from the transcription at 404 in order to segment the audio file based upon signal entropy at 410. In a non-limiting embodiment the segmentation may be performed with voice activity detection (VAD) that seeks to identify segments of the audio data that are likely to contain speech apart from segments that are likely to be non-speech. The signal entropy can be used to identify silent or pause intervals in the audio file, which can also serve to segment the audio file. More detailed exemplary embodiments of this segmentation are disclosed herein.

Next at 412 the identified segments in the audio file using one or both of the methods as described above are clustered. In an exemplary embodiment, the audio file segments are iteratively clustered using agglomerative hierarchical clustering (AHC). In such an iterative clustering, the merging order of the cluster may be based upon a calculated Bayesian information criteria (BIC) and giving a BIC penalty. In an embodiment, the iterative clustering continues until no two clusters have a BIC score greater than zero. In an embodiment at this stage the clustering may result in any number of clusters, although at least two clusters is preferred in the setting wherein at least two speakers are expected.

In still further embodiments, if there are more than two clusters when two speakers are expected, then two representative clusters may be selected by first removing any cluster that does not contain a predetermined number if words. Once the clusters are filtered with a minimum size criteria, then the two most distinct clusters as evaluated in terms of the BIC score are selected as the first speaker cluster and the second speaker cluster. In an embodiment, it will be recognized that the speaker clusters may be rejected if the two speaker clusters are too similar in that that the BIC scores are too close or if one of the selected speaker cluster is substantially larger (e.g. 10 times or more larger) than the other selected speaker cluster. In such an instance the speaker clusters may be rejected as being invalid.

Next, at 414 a model is created from the first speaker cluster and the second speaker cluster. These initial first speaker model and second speaker models are compared to the audio file segments to, exemplarily by application of the first speaker model and the second speaker model to the audio file segments with the Viterbi algorithm to calculate the likelihood of each of the audio file segments to belong to each speaker or as an unclassified segment. The first speaker model and the second speaker model are then retrained based upon the new larger assignment of audio file segments to the first speaker model and the second speaker model.

At 416 the refined first speaker model and the second speaker model are applied to the unclassified speaker segments in order to classify the unclassified segments into either the first speaker cluster or the second speaker cluster.

In an embodiment, the quality of the blind diarization, can be calculated by combining the BIC scores, model separation, and speaker's speech time ratio. The BIC score is the distance between the two original speaker's clusters used for the model build up and reflect the distinction between the original segments. A low distance can be indicative of mixed clusters or similar speakers. The model separation is a weighted amount of segments which have a likelihood difference below a certain value divided by the total amount of segments. The model separation represent how unequivocal the likelihood of decoded speech segments. The speakers speech time ratio is a percentage of speech segment assigned to the speaker that speaks the least.

In still further exemplary embodiment the blind diarization may be repeated with varying values of BIC penalty and with different types of Gaussian modeling. In such an embodiment the blind diarization achieves the minimum value of blind diarization score is selected.

As described above with respect to FIGS. 1 and 3, once the blind diarization is compete, then at 418 the first speaker audio file and a second audio file are compared to the agent model. This comparison may be exemplarily performed using a Viterbi algorithm, although it is to be recognized that other forms of comparison may be used within the score of the present disclosure. As a result from the comparison at 418, at 420 one of the speaker audio files is identified as the agent audio file and the other speaker audio file is identified as the customer audio file. In such an embodiment, the audio file identified as the agent audio file is the audio file that is most similar or compares most favorably to the agent model, while the customer audio file is the other audio file that compared less favorably to the agent model.

Finally at 422 a diarized agent and customer transcript is produced, exemplarily by using a Viterbi algorithm in an LVCSR transcription to apply one or more agent models to the agent audio file and one or more customer models to the customer audio file. As referenced above, since the transcriptions and audio files are timed stamped, the transcription can be maintained in temporal order even through the agent audio file and customer audio file are transcribed in separate processes.

Figure 6:
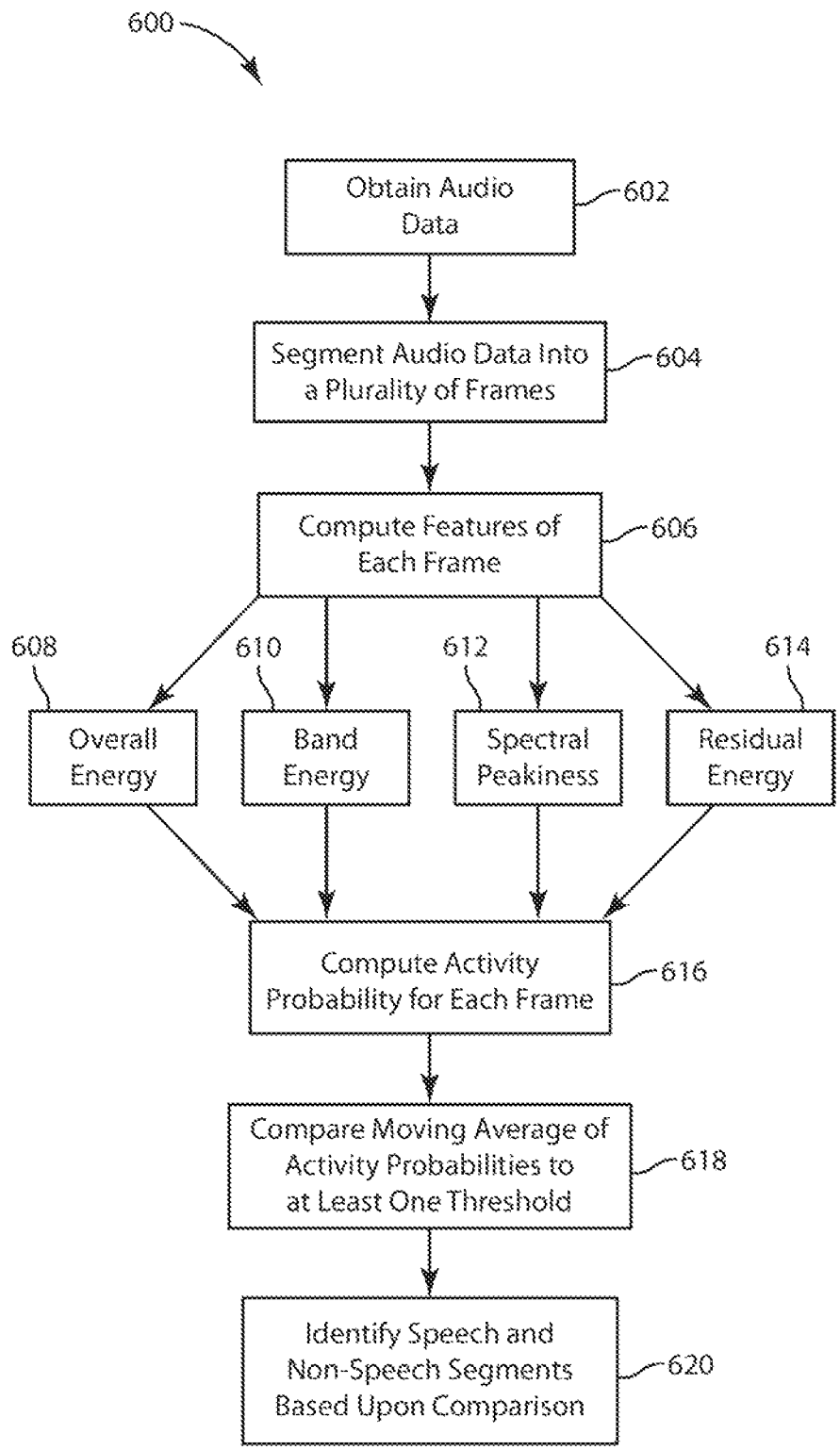
FIG. 6 is a flowchart that depicts an exemplary embodiment of a method of voice activity detection.

As described above, embodiments of the methods as disclosed herein can segment the audio data file based upon signal entropy. FIG. 6 is a flowchart that depicts an exemplarily embodiment of a method 600 of voice activity detection (VAD). VAD may exemplarily be used in audio file segmentation in embodiments of diarization as disclosed herein. As disclosed in further detail, energy values over time can be traced according to the method of FIG. 5. The speech-presence probability estimated for each frame based on these values. Additional information regarding noise spectrum estimation is provided by I. Cohen. Noise spectrum estimation in adverse environment: Improved Minima Controlled Recursive Averaging. IEEE Trans. on Speech and Audio Processing, vol. 11(5), pages 466-475, 2003, which is hereby incorporated by reference in its entirety. In the following description a series of energy values computed from each frame in the processed signal, denoted $E_1, E_2, \ldots, E_T$ is assumed. All $E_1$ values are measured in dB. Furthermore, for each frame the following parameters are calculated:

$S_t$—the smoothed signal energy (in dB) at time t.
$\tau_t$—the minimal signal energy (in dB) traced at time t.
$\tau_t^{(u)}$—the backup values for the minimum tracer, for $1 \leq u \leq U$ (U is a parameter).
$P_t$—the speech-presence probability at time t.
$B_t$—the estimated energy of the background signal (in dB) at time t.

The first frame is initialized $S_1, \tau_1, \tau_1^{(u)}$ (for each $1 \leq u \leq U$), and $B_1$ is equal to $E_1$ and $P_1=0$. The index u is set to be 1.

For each frame t>1, the method 300 is performed.

At 502 the smoothed energy value is computed and the minimum tracers ($0<\alpha_s<1$ is a parameter) are updated, exemplarily by the following equations:

$$S_t = \alpha_s \cdot S_{t-1} + (1-\alpha_s) \cdot E_t$$

$$\tau_t = \min(\tau_{t-1}, S_t)$$

$$\tau_t^{(u)} = \min(\tau_{t-1}^{(u)}, S_t)$$

Then at 504, an initial estimation is obtained for the presence of a speech signal on top of the background signal in the current frame. This initial estimation is based upon the difference between the smoothed power and the traced minimum power. The greater the difference between the smoothed power and the traced minimum power, the more probable it is that a speech signal exists. A sigmoid function $$\sum(x; \mu, \sigma) = \frac{1}{1 + e^{\sigma(\mu - x)}}$$

can be used, where $\mu$, $\sigma$ are the sigmoid parameters:

$$q = \Sigma(S_t - \tau_t; \mu, \sigma)$$

Next, at 506, the estimation of the background energy is updated. Note that in the event that q is low (e.g. close to 0), in an embodiment an update rate controlled by the parameter $0<\alpha_B<1$ is obtained. In the event that this probability is high, a previous estimate may be maintained:

$$\beta = \alpha_B + (1-\alpha_B) \cdot \sqrt{q}$$

$$B_t = \beta \cdot E_{t-1} + (1-\beta) \cdot S_t$$

The speech-presence probability is estimated at 508 based on the comparison of the smoothed energy and the estimated background energy (again, $\mu$, $\sigma$ are the sigmoid parameters and $0<\alpha_P<1$ is a parameter):

$$p = \Sigma(S_t - B_t; \mu, \sigma)$$

$$P_t = \alpha_P \cdot P_{t-1} + (1-\alpha_P) \cdot p$$

In the event that t is divisible by V (V is an integer parameter which determines the length of a sub-interval for minimum tracing), then at 510, the sub-interval index u modulo U (U is the number of sub-intervals) is incremented and the values of the tracers are reset at 512:

$$\tau_t = \min_{1 \leq v \leq U} \{\tau_t^{(v)}\}$$

$$\tau_t^{(v)} = S_t$$

In embodiments, this mechanism enables the detection of changes in the background energy level. If the background energy level increases, (e.g. due to change in the ambient noise), this change can be traced after about U·V frames.

Referring to the method 600 of voice activity detection, exemplarily begin at 602 by obtaining audio data. As explained above, the audio data may be in a variety of stored or streaming formats, including mono audio data. At 604, the audio data is segmented into a plurality of frames. It is to be understood that in alternative embodiments, the method 100 may alternatively begin receiving audio data already in a segmented format.

Next, at 606, one or more of a plurality of frame features are computed. In embodiments, each of the features are a probability that the frame contains speech, or a speech probability. Given an input frame that comprises samples $x_1, x_2, \ldots, x_F$ (wherein F is the frame size), one or more, and in an embodiment, all of the following features are computed.

At 608, the overall energy speech probability of the frame is computed. Exemplarily the overall energy of the frame is computed by the equation:

$$\bar{E} = 10 \cdot \log_{10}\left(\sum_{k=1}^{F} (x_k)^2\right)$$

As explained above with respect to FIG. 5, the series of energy levels can be traced. The overall energy speech probability for the current frame, denoted as $p_E$ can be obtained and smoothed given a parameter $0<\alpha<1$:

$$\tilde{p}_E = \alpha \cdot \tilde{p}_E + (1-\alpha) \cdot p_E$$

Next, at 610, a band energy speech probability is computed. This is performed by first computing the temporal spectrum of the frame (e.g., by concatenating the frame to the tail of the previous frame, multiplying the concatenated frames by a Hamming window, and applying Fourier transform of order N). Let $X_0, X_1, \ldots, X_{N/2}$ be the spectral coefficients. The temporal spectrum is then subdivided into bands specified by a set of filters $H_0^{(b)}, H_1^{(b)}, \ldots, H_{N/2}^{(b)}$ for $1 \leq b \leq M$ (wherein M is the number of bands; the spectral filters may be triangular and centered around various frequencies such that $\Sigma_k H_k^{(b)}=1$). Further detail of one embodiment is exemplarily provided by I. Cohen, and a B. Berdugo. *Spectral enhancement by tracking speech presence probability in sub-bands*. Proc. International Workshop on Hand-free Speech Communication (HSC'01), pages 95-98, 2001, which is hereby incorporated by reference in its entirety. The energy level for each band is exemplarily computed using the equation:

$$E^{(b)} = 10 \cdot \log_{10}\left(\sum_{k=0}^{N/2} H_k^{(b)} \cdot |X_k|^2\right)$$

The series of energy levels for each band is traced, as explained above with respect to FIG. 5. The band energy speech probability $P_B$ for each band in the current frame, which we denote $p^{(b)}$ is obtained, resulting in:

$$p_B = \frac{1}{M} \cdot \sum_{b=1}^{M} p^{(b)}$$

At 612, a spectral peakiness speech probability is computed A spectral peakiness ratio is defined as:

$$\rho = \frac{\sum_{k:|X_k|>|X_{k-1}|,|X_{k+1}|} |X_k|^2}{\sum_{k=0}^{N/2} |X_k|^2}$$

The spectral peakiness ratio measures how much energy in concentrated in the spectral peaks. Most speech segments are characterized by vocal harmonies, therefore this ratio is expected to be high during speech segments. The spectral peakiness ratio can be used to disambiguate between vocal segments and segments that contain background noises. The spectral peakiness speech probability $p_P$ for the frame is obtained by normalizing $\rho$ by a maximal value $\rho_{max}$ (which is a parameter), exemplarily in the following equations:

$$p_P = \frac{\rho}{\rho_{max}}$$

$$\tilde{p}_P = \alpha \cdot \tilde{p}_P + (1-\alpha) \cdot p_P$$

At 614, the residual energy speech probability for each frame is calculated. To calculate the residual energy, first a linear prediction analysis is performed on the frame. In the linear prediction analysis given the samples $x_1, x_2, \ldots, x_F$ a set of linear coefficients $a_1, a_2, \ldots, a_L$ (L is the linear-prediction order) is computed, such that the following expression, known as the linear-prediction error, is brought to a minimum:

$$\varepsilon = \sum_{k=1}^{F} \left(x_k - \sum_{t=1}^{L} a_i \cdot x_{k-i}\right)^2$$

The linear coefficients may exemplarily be computed using a process known as the Levinson-Durbin algorithm which is described in further detail in M. H. Hayes. Statistical Digital Signal Processing and Modeling. J. Wiley & Sons Inc., New York, 1996, which is hereby incorporated by reference in its entirety. The linear-prediction error (relative to overall the frame energy) is high for noises such as ticks or clicks, while in speech segments (and also for regular ambient noise) the linear-prediction error is expected to be low. We therefore define the residual energy speech probability ($P_R$) as:

$$p_R = \left(1 - \frac{\varepsilon}{\sum_{k=1}^{F} (x_k)^2}\right)^2$$

$$\tilde{p}_R = \alpha \cdot \tilde{p}_R + (1-\alpha) \cdot p_R$$

After one or more of the features highlighted above are calculated, an activity probability Q for each frame cab be calculated at 616 as a combination of the speech probabilities for the Band energy ($P_B$), Total energy ($P_E$), Energy Peakiness ($P_P$), and Residual Energy ($P_R$) computed as described above for each frame. The activity probability (Q) is exemplarily given by the equation:

$$Q = \sqrt{p_B \cdot \max\{\tilde{p}_E, \tilde{p}_P, \tilde{p}_R\}}$$

After the activity probability (Q) is calculated for each frame at 616, the activity probabilities ($Q_t$) can be used to detect the start and end of speech in audio data. Exemplarily, a sequence of activity probabilities are denoted by $Q_1, Q_2, \ldots, Q_T$. For each frame, let $\hat{Q}_t$ be the average of the probability values over the last L frames:

$$\hat{Q}_t = \frac{1}{L} \cdot \sum_{k=0}^{L-1} Q_{t-k}$$

The detection of speech or non-speech segments is carried out with a comparison at 618 of the average activity probability $\hat{Q}_t$ to at least one threshold (e.g. $Q_{max}, Q_{min}$). The detection of speech or non-speech segments co-believed as a state machine with two states, "non-speech" and "speech":

Start from the "non-speech" state and t=1
Given the tth frame, compute $Q_t$ and the update $\hat{Q}_t$
Act according to the current state
If the current state is "no speech":
Check if $\hat{Q}_t > Q_{max}$. If so, mark the beginning of a speech segment at time (t−k), and move to the "speech" state.
If the current state is "speech":
Check if $\hat{Q}_t < Q_{min}$. If so, mark the end of a speech segment at time (t−k), and move to the "no speech" state.
Increment t and return to step 2.

Thus, at 620 the identification of speech or non-speech segments is based upon the above comparison of the moving average of the activity probabilities to at least one threshold. In an embodiment, $Q_{max}$ therefore represents an maximum activity probability to remain in a non-speech state, while $Q_{min}$ represents a minimum activity probability to remain in the speech state.

In an embodiment, the detection process is more robust then previous VAD methods, as the detection process requires a sufficient accumulation of activity probabilities over several frames to detect start-of-speech, or conversely, to have enough contiguous frames with low activity probability to detect end-of-speech.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of separating speakers in an audio file, the method comprising:
    obtaining the audio file:
    transcribing the audio file into at least one text file:
    identifying homogeneous speech segments within the at least one text file;
    segmenting the audio file into homogeneous audio segments that correspond to the identified homogeneous speech segments;
    separating the homogeneous audio segments of the audio file into a first speaker audio file and a second speaker audio file, wherein the first speaker audio file only contains audio attributed to the first speaker, and wherein the second speaker audio file only contains audio attributed to the second speaker;
    determining which combination of the homogenous speaker segments has a greater likelihood of matching an agent speech model by at least comparing the agent speech model to audio found in first speaker audio file and audio found in the second speaker audio file;
    based on the comparing, identifying one of the first speaker audio file and the second speaker audio file as being an agent audio file and identifying the other of the first speaker audio file and the second speaker audio file as being a customer audio file; and
    transcribing the agent audio file and the customer audio file to produce a diarized transcript.

2. The method of claim 1, further comprising filtering the audio file to remove non-speech segments.

3. The method of claim 2, further comprising;
    identifying long speech segments in the homogenous audio segments: and
    splitting the long speech segments based upon contextual information from the identified homogeneous speech segments.

4. The method of claim 2, further wherein filtering of the audio file comprises energy envelope filtering to remove segments with energy determined to be below a lower energy threshold or above an upper energy threshold.

5. The method of claim 1 wherein separating the audio file into a first speaker audio file and a second audio file further comprises:
    clustering the identified homogenous segments:
    creating a first speaker model and a second speaker model from the clustered identified segments; and
    identifying unclustered segments by comparing an unclustered segment to the first speaker model and the second speaker model.

6. The method of claim 1 further comprising:
    splitting the audio file into a plurality of frames;
    segmenting the audio file into entropy segments based upon an entropy of each frame; and
    clustering the entropy segments and the homogeneous audio segments.

7. A method of claim 1, further comprising:
    segmenting the audio file into a plurality of frames;
    calculating an overall energy speech probability for each frame;
    calculating a band energy speech probability for each frame;
    calculating a spectral peakiness speech probability for each frame
    calculating a residual energy speech probability for each frame;
    computing an activity probability for each frame from the overall energy speech probability, band energy speech probability, spectral peakiness speech probability, and residual energy speech probability;
    comparing a moving average of activity probabilities to at least one threshold; and
    identifying a speech and non-speech segments in the audio data based upon the comparison.

8. A method of audio diarization, the method comprising:
    obtaining a digital audio file;
    transcribing the digital audio file with an automated transcription to produce a text file;
    identifying homogeneous speech segments in the text file;
    segmenting the digital audio file into digital audio file segments based upon the identified homogenous speech segments in the text file;
    performing a blind diarization that separates the homogeneous audio segments of the digital audio file into a first speaker audio file and a second speaker audio file, wherein the first speak audio file only contains audio attributed to the first speaker, wherein the second speaker audio file only contains audio attributed to the second speaker, and wherein the blind diarization comprises clustering the digital audio file segments into groups that discriminate between speakers;
    identifying one of the first speaker audio file and second speaker audio file as being an agent audio file and identifying the other of the first speaker audio file and the second speaker audio file as being a customer audio file; and
    transcribing the agent audio file and the customer audio file to produce a diarized transcript.

9. A method of claim 8, further comprising: segmenting the audio file into a plurality of frames;
    calculating an overall energy speech probability for each frame;
    calculating a band energy speech probability for each frame;
    calculating a spectral peakiness speech probability for each frame; calculating a residual energy speech probability for each frame
    computing an activity probability for each frame from the overall energy speech probability, band energy speech probability, spectral peakiness speech probability, and residual energy speech probability;
    comparing a moving average of activity probabilities to at least one threshold; and
    identifying a speech and non-speech segments in the audio data based upon the comparison.

10. The method of claim 8, further comprising:
filtering the audio file to remove non-speech segments;
identifying long speech segments in the homogenous speech segments; and
splitting the long speech segments based upon contextual information from the identified homogeneous speech segments.

11. The method of claim 8, wherein transcribing the digital audio file comprises applying an agent model to the digital audio file;
wherein identifying one of the first speaker audio file and the second speaker audio file as the agent audio file, comprises comparing the first speaker audio file and the second speaker audio file to the agent model.

12. The method of claim 8, further comprising:
splitting the audio file into a plurality of frames;
segmenting the audio file into entropy segments based upon an entropy of each frame; and
clustering the entropy segments and the homogeneous audio segments.

13. A system for audio diarization, the system comprising:
a transcription server that receives audio data, transcribes the audio data, and creates an information file that identifies at least one homogeneous speech segment from the transcribed audio data:
a blind diarization module operating on a computer processor, the blind diarization module receives the audio data and the information file, the blind diarization module separates the homogeneous audio segments of the digital audio file into a first speaker audio file and a second speaker audio file, wherein the first speak audio file only contains audio attributed to the first speaker, and wherein the second speaker audio file only contains audio attributed to the second speaker;
an agent diarization module operating on the computer processor, the agent diarization module receives an agent speech model, the agent diarization module determines which combination of the homogenous speaker segments has a greater likelihood of matching the agent speech model by at least comparing the agent speech model to audio found in first speaker audio file and audio found in the second speaker audio file, and based on the comparing, the diarization module identifies one of the first and second speaker audio files as being an agent audio file and identifies the other of the first and second speaker audio files as being a customer audio file; and
a transcription server that receives the agent audio file and the customer audio file and transcribes the agent audio file and the customer audio file to produce a diarized transcript.

14. The system of claim 13, wherein the blind diarization module further filters the audio file to remove non-speech segments, identifies long speech segments in the homogeneous speech segments and splits the long speech segments based upon contextual information from the identified homogenous speech segments.

15. The system of claim 13, wherein the blind diarization module further splits the audio file into a plurality of frames, segments the audio file into entropy segments based upon an entropy of each frame, and clusters the entropy segments and the homogeneous audio segments.

* * * * *